United States Patent [19]
Lais

[11] Patent Number: 5,936,315
[45] Date of Patent: Aug. 10, 1999

[54] DRIVING DATA RECORDING DEVICE FOR MOTOR VEHICLE MOUNTED DIRECTLY ON OR IN THE DRIVE GEAR HOUSING SHELL

[75] Inventor: Norbert Lais, Villingen-Schwenningen, Germany

[73] Assignee: VDO Adolf Schindling AG, Frankfurt, Germany

[21] Appl. No.: 08/945,058

[22] PCT Filed: Apr. 11, 1996

[86] PCT No.: PCT/EP96/01544

§ 371 Date: Oct. 13, 1997

§ 102(e) Date: Oct. 13, 1997

[87] PCT Pub. No.: WO96/32699

PCT Pub. Date: Oct. 17, 1996

[30] Foreign Application Priority Data

Apr. 13, 1995 [DE] Germany .......................... 195 14 008

[51] Int. Cl.[6] ........................................................ B60L 1/00
[52] U.S. Cl. ............................. 307/10.1; 340/441; 701/35
[58] Field of Search .................................... 307/9.1, 10.1, 307/10.7; 340/466, 936, 988, 993, 994, 441; 701/1, 29, 30, 35; 116/28.1, 35 R, 37

[56] References Cited

U.S. PATENT DOCUMENTS 5,191,529 3/1993 Ramsey et al. ........................... 701/35
5,550,738 8/1996 Bailey et al. ............................. 701/35

Primary Examiner—Richard T. Elms
Attorney, Agent, or Firm—Anderson, Kill & Olick, P.C.

[57] ABSTRACT

A driving data recording device for a motor vehicle for collecting at least one of time- and speed-dependent data and including, housing having an element for securing the housing to a housing shell of a motor vehicle drive gear, a control module for processing collected data and located in the housing, and a memory located in the housing and cooperating with the control module.

10 Claims, 6 Drawing Sheets

DRIVING DATA RECORDING DEVICE FOR MOTOR VEHICLE MOUNTED DIRECTLY ON OR IN THE DRIVE GEAR HOUSING SHELL

BACKGROUND OF THE INVENTION

1. Field of the Invention

The invention relates to a driving data recording device or a trip recorder for a motor vehicle and includes a device for collecting time- and/or speed-dependent driving data, which is mounted directly on or in the drive gear housing shell.

2. Description of the Prior Art

Such apparatuses, generally called tachographs, with electronic data recording are disclosed in European Patents EP-O 188 429-B1 and EP-O 191 413 B1. On the other hand, such tachographs are modified further for recording the driving data directly on the speed-time chart.

Tachographs are primarily used, because of existing legal requirements in trucks and serve for storing data, which characterize the transport performance in a way that enables a simple and reliable reconstruction of the driving or travel course by drivers, vehicle owners and authorized monitoring bodies.

These apparatuses permitted to eliminate log books and, because of this, are required to record, to the same extent, vehicle data for times of a day, i.e., speeds, covered distance, stationary periods and, if necessary, other vehicle data.

Through the tachographs with time-speed charts proved themselves in practice and despite of the use of electronic storage cards and storage cassettes as driving data memory, because of a particular competition situation in the transportation industry, attempts to manipulate the tachographs or their data carriers in a fraudulent way should be taken into account. Securing of these apparatuses against obvious manipulative attempts is possible with additional expenses. The manufacturing and mounting of such apparatuses are unavoidably accompanied by additional costs, and an absolute security against manipulation can be achieved only with prohibitively high expenses.

The manipulation problems such as, e.g., producing the obligation of the driver, written data carriers, such as trip documents one or several days before, are discussed in detail in the already mentioned prior art and, for the sake of shortening the description, need not be repeated here again.

Accordingly, an object of the invention is a trip recorder having a substantially improved security against deliberate attempts to manipulate the data collection or to alter them and which can be produced substantially more economically than the known tachographs.

SUMMARY OF THE INVENTION

The present invention solves the posed problem with regard to the improvement of the costs-benefit ratio of the inventive apparatus in a substantial way, by providing a pure electronic, substantially digitally operating trip recorder which has a miniaturized design, can be mounted directly on or in a housing shell of a motor vehicle drive gear, and is equipped with a temperature-insensitive processor and memory electronics. According to the invention, the necessary electronics for recording and storage processes is contained in a single apparatus and is independent of optionally connected additional apparatuses and instruments. In addition, it requires only a small number of connecting lines and little electrical power. At that, the inventive trip recorder has a sufficiently large memory capacity for recording of the driving data which, in case of a failure of the voltage supply, are still secured, i.e., are stored permanently.

The trip recorder according to the present invention has very small dimensions and noticeable use advantages (in particular with regard to its mounting and maintenance costs) in comparison with conventional comparative apparatuses. The use of these apparatuses presents multiple operational and handling advantages which are practically provided only by digitally operating electronics. In addition, there exists a possibility to fetch directly, in accordance with a correct time of the day and in detail, time- and/or distance-dependent speeds which correspond to conditions of the vehicle during the respective time of the day. There further exists a possibility to connect different displays and terminals of which only a small number is stationary mounted in the vehicle.

The trip recorder according to the present invention, because of its pure digital operation, is suitable for a number of additional functions which follow from the above-discussed basic functions.

The following functions are included in the additional functions:

easy adaptation of the apparatus for different type of motor vehicles and their engines or drive gears;

a possibility of linkage with an exact, absolute time.

This is achieved, on one hand, by suitable interfaces through which the necessary data are accessible from outside and through which in the same manner, the necessary data can be programmed or synchronized from outside. On the other hand, the above-mentioned special functions of such apparatuses can be arranged by using provided internal memories which are partially unprogrammable or which have adaptation (electronic) tables.

The invention proceeds from a knowledge that by using a suitable processor and memory system, it is possible to mount all of the essential system components of the apparatus, including an emergency power supply, in a single compact housing and to mount such a compact trip recorder in the drive gear housing of a conventional motor vehicle drive gear. Due to its construction and the system components, which are used, it is adequately protected against comparatively high temperature variations when it is placed in the vicinity of the engine.

As it is conventional in motor vehicles, as a reference potential line for power supply and signal conductors or lines, the chassis of the motor vehicle or metallic components and unit, which are fixedly connected with the chassis, are used. Under this prerequisite, according to the present invention, it is possible to provide the trip recorder with maximum three external connecting lines, namely, a power supply line, travel signal line and a so-called interface line.

The travel signal line serves essentially for transmitting information to an odometer and/or a tachometer, which are usually located in the field of vision of the driver and provide the driver, with a possibility to adapt the vehicle speed to a respective driving condition and to evaluate an actual distance driven.

The interface line of the trip recorder is a bidirectional line, i.e., in addition to the transmission of the signal flow essentially to an associated display, there exists a possibility of transferring data from this display or another built-in data display with an enlarged display capacity manually to operational control elements. Such an enlarged display is usually suitable for receiving further data which are produced not by the trip recorder—but are rather, e.g., indicative of actual engine parameters and other vehicle-relevant data. To them belong, e.g. the evaluation and display of radio signals indicating an exact time or a geographical position.

It is further possible, according to the present invention, to connect, by using the so-called interface line, a mobile read-out/programming terminal which enables not only function control of the trip recorder but also read-out of all information, which is stored in it. In addition, such a read-out/programming terminal enables to program anew or reprogram the information memory in the trip recorder which can be written over either one time or several times, as required, e.g., for the following functions:

- to produce coefficients, specific for a motor vehicle, for calculating pulse count sum in actually covered distances;
- to indicate the date of actuation of the trip recorder;
- to indicate an exact, actual time.

According to the invention, in a particular embodiment of the inventive trip recorder, the conductor or line for the travel signal and a power conductor or line are combined. To this end, wire-bound conductors are used.

In accordance with a further aspect of the present invention, in order to provide an increased protection against any damage and manipulation, electrical connecting lines are completely eliminated, and only light guide lines are provided between the trip recorder and the outside. To this end, an external energy supply is provided which feeds the trip recorder via a light guide with a required optical power of above 100 mW. A further optical line is provided for supplying, from outside, e.g., program data to the trip recorder. There is further provided a sending line from the trip recorder for a multiplex, i.e., time-sharing transmission of distance—and interface signals. In accordance with a particular embodiment of the trip recorder, these signals can also be transmitted via metallic signal and/or connecting lines.

According to the invention, an operational measure for increasing protection against damage and for making the manipulation of the trip recorder, more difficult consists in not making external power supply via an electrical or optical line the only source of power for the trip recorder. Rather, according to the further development of the present invention, the trip recorder is provided with its own power source located inside the trip recorder, which is formed as an integrated, comparatively small generator, the movable element of which is formed by teeth of a drive gear wheel which simultaneously scanned by a sensor mounted inside of the trip recorder. A particular aspect of the invention is based on a knowledge that both the sensor and the power source form a single unit to thereby reduce the volume and manufacturing costs of the trip recorder.

According to the invention, the trip recorder can be mounted inside a single housing having a volume of maximum 10 cm³. The trip recorder in addition to the already mentioned sensor and an optional power source unit which, if necessary, is combined with the sensor in a single unit, includes the following system components:

- a timer for generating precise time signals, wherein the timer has at least one crystal oscillator and, if necessary, is synchronize with a signal from an external clock and, optionally, by a radio signal;
- a computation and/or control unit formed on microelectronic basis;
- at least one electronic memory unit with non-volatile memory content;
- a power supply unit and an energy storage unit in form of an accumulator or a condensator;
- adaptation electronics which converts signals, which are generated inside and outside of the trip recorder in accordance with input and output parameters of the trip recorder, and transmits them to connected electrical or optical lines.

The multiple functions of the trip recorder will be explained below based on the operation of separate internally arranged system components. The main components of the trip recorder are a control module, which receives the useful data supplied by the system sensor and records them, and further matches them with control data and provides for storage of the data or outputs them, and a data recording system which effects self-monitoring and coordinates the data flows of all internally generated data which also effects the coordination of transfer of data which are received from outside and/or outputted by the trip recorder.

The basic function of the inventive trip recorder consists in acquisition of travel pulses and corresponding precise time data, and therefore the two main component of the system should meet increased demands with regard to reliability and precision.

BRIEF DESCRIPTION OF THE DRAWINGS

Below with reference to separate system components, a preferred embodiment of the invention, which is presented in the drawings, will be described. In the drawings.

DETAILED DESCRIPTION OF THE PREFERRED EMBODIMENT

Figure 1:
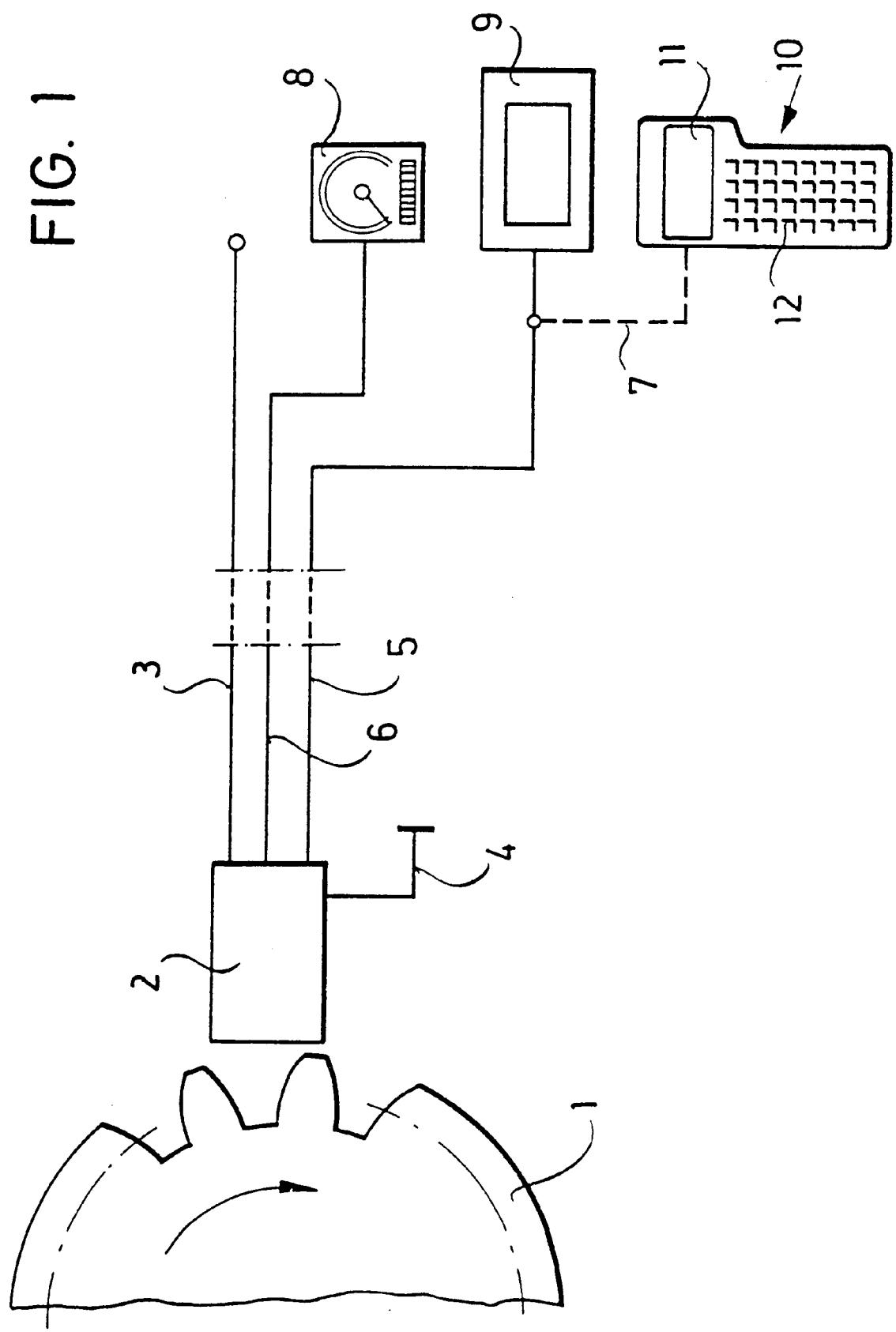
FIG. 1 shows a block-diagram illustrating a general arrangement of main components of a trip recorder according to the present invention and peripheral units.

As shown in FIG. 1, the trip records according to the present invention should be considered as a part of a total system consisting of a recording part, display and programmed part. The trip recorder 2, which is formed as a compact and essentially integrated structure, is arranged at a predetermined, comparatively small distance from a symbolically shown drive gear 1 and includes at least one, internally arranged sensor which enables to recognize presence or absence of a tooth of the drive gear 1 which rotates in the vicinity of a front end surface of the trip recorder 2. The trip recorder 2 is constantly supplied with an electric power through the supply conductor 3. The feeding of the electrical energy to the trip recorder 2 is effected in a technically simple but not necessarily cost-effective manner. The energy consumption of the trip recorder is comparatively small and, due to the integrated construction of the trip recorder 2, is in a range below 100 milliwatt. The trip recorder 2 includes all necessary electronics, necessary buffer voltage and necessary conduct for matching means provided for an output signal conductor 6 and for bi-directionally operating input/signal conductors 5 and 7. A metallic reference potential connection is designated with reference numeral 4.

As discussed above, the shown conductors are wired in a cost-effective manner. In one of the embodiments, in order to provide an increased interference protection and a protection against manipulation, the conductors are formed as light guides. In a special embodiment of a trip recorder according to the present invention, the power supply conductor 3 is also formed as a light guide and supplies the power in form of light. When the conductor 3, 5, 6 and 7 are formed of wire, according to a preferred embodiment of the invention, the number of provided connecting conductors is reduced to a minimum so that in the most optimal case, a single conductor becomes available which should perform functions of both power supply and signal transmission.

In the embodiment of a trip recorder according to the present invention which is shown in FIG. 1, only a single, unidirectional conductor 6 is provided for transmitting signal data, which indicate the vehicle speed and the distance driven, to the tachometer 8. As shown in FIG. 1, the bidirectional conduit 5 is connected to a rigidly secured display 9. The display 9 serves for displaying of a stored speed curve over the passed period of time, but also for displaying error messages of the trip recorder 2. The display 9 also serves for the synchronization of the trip recorder 2. From the display 9, the drive data received by the display 9 can be transmitted optionally, in a real or processed form, to additional devices of the motor vehicle so that, e.g., a control of the entire recording system by an overriding on-board computer is possible. If necessary, the control may be effected from a stationary host computer which is connected with the motor vehicle by a radio link. It is further possible to connect the trip recorder 2 with a mobile terminal 10 provided with a display 11. Such terminal 10 serves for inspection and display of a particular information such as, e.g., histograms, for surveying of possibly occurring malfunctions for programming and the synchronization of the trip recorder 2, in particular during its first actuation. To this end, the mobile terminal 10 is connected to the signal conductor 5 by the signal conductor 7.

As it has already been mentioned above, the number of signal conductors in the most favorable case is reduced to one electrical conductor, with the motor vehicle chassis, usually acting as a return conductor. In the case when the conductor are formed as light guides, the number of connecting conductors can be reduced to three, the power supply conductor, the signal input conductor and the signal output conductor.

Figure 2:
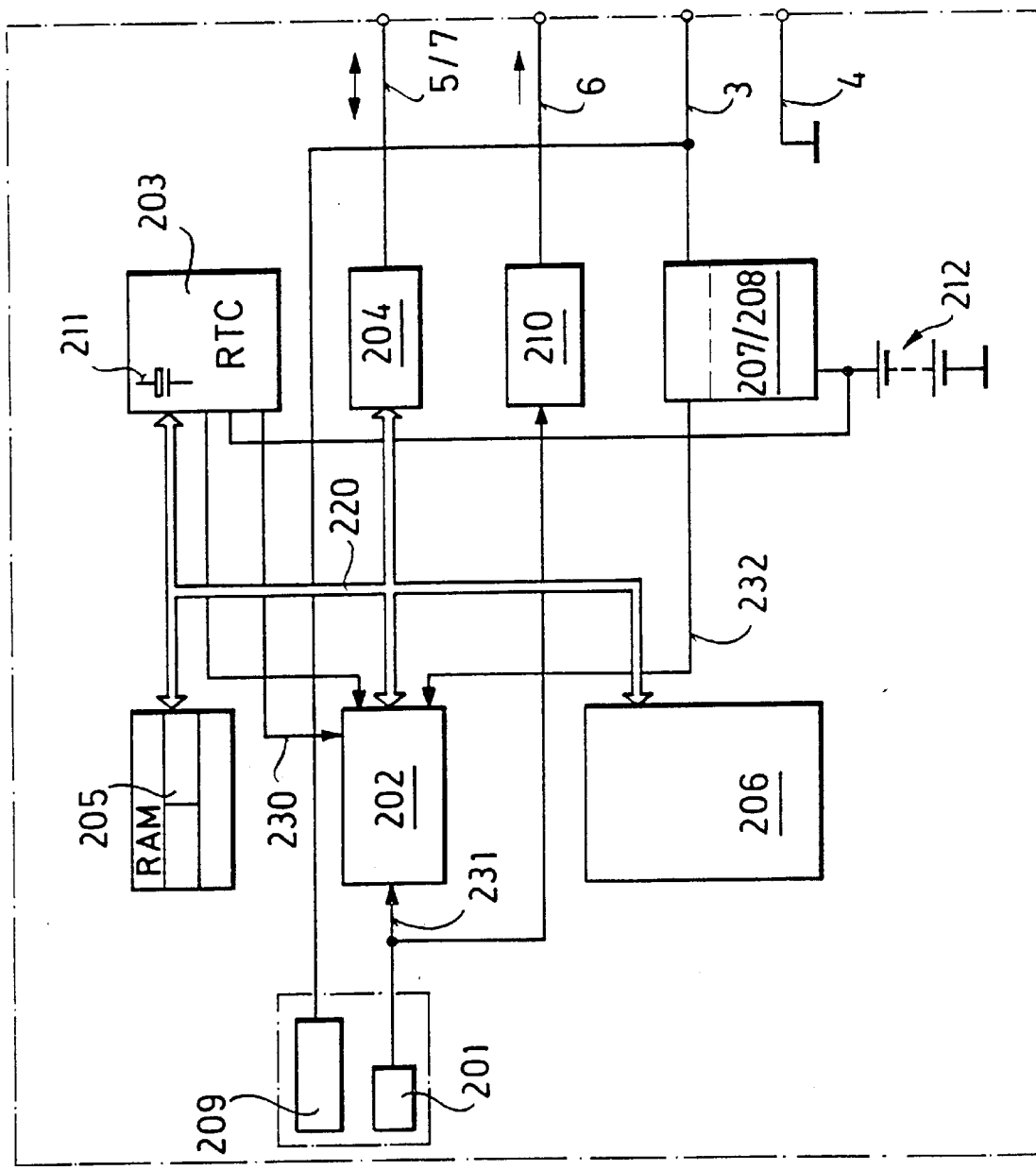
FIG. 2 shows a detailed schematic unit diagram of a trip recorder according to the present invention.

FIG. 2 shows a detailed unit diagram of the trip recorder according to the present invention. The trip recorder is either screwed in or pressed into a bore formed in the motor vehicle drive gear housing, so that the trip recorder cannot be removed without dismounting of the drive gear. According to the construction of the trip recorder contemplated by the present invention, the movement of the teeth of the drive gear 1 is sensed by a sensor provided in the vicinity of the drive gear. It is of importance that sensors, which have small dimensions and an adequate thermal resistance, are available in a plurality of different forms. For high temperatures, Hall sensors are preferred. E.g., CMOS-technology permits to produce sensors the extreme junction temperatures of which lie in the range from −40° C. to 150° C. (e.g., Hall-sensor type HAL300 of the firm JTT). For detecting a tooth of a gear rotable in the vicinity of the sensor, a permanent magnetic fields need be associated with a Hall sensor. The sensor 201 already generates a signal at a low vehicle speed in response to the rotation of the drive gear which rotation represents a direct measure of the driven distance of the motor vehicle. The sensor, in response to the vehicle speed exceeding a predetermined value, generates a signal of a usable electrical power which, if necessary, according to the invention, is simultaneously used for recharging of an internal battery of the apparatus. In this way, proper operation of the trip recorder can be maintained either constantly or at least during a certain period of time in case the current supply via the external power supply conduit 3 is absent.

A signal generated by the sensor 201 is brought, if necessary, by a signal conditioning stage, in a suitable, advantageously pulse form and is transmitted via a conduit 231 to one of a plurality of interrupt inputs of a control module 202 associated, in accordance with the state of the art, with a microprocessor, microcontroller or any other suitable digital microelectronic circuit. Thereby, the control module 202 updates, e.g., in accordance with instructions of a predetermined program, with each positive increased leading edge of such pulse signal, those distance-dependent data and stored information which later serves for the reconstruction of the distance-time curve or the speed-time curve. The control module 202 can be formed as a distributing center of the trip recorder as it coordinates the entire management and processing of data. The signal generated by the sensor 201 is simultaneously transmitted to a driver stage 210 which amplifies or converts the signal so that it has, when being transmitted via the signal conductor 6, a sufficiently high signal/noise ratio, and which takes care that accidental or intentional external voltage accompanying the signal in the signal conductor 6, normally has no negative effect on data recordings.

The interrupt signals applied to the control module 202 usually bring about a particular and important change in the regularly subsiding program of this module or shift the program from a non-operative condition into an operative condition. This takes particularly place when an interrupt signal from a timer 203 is transmitted to the control module 202. The timer 203 transmits, with a constant timing pulse, preferably, with a second frequency, a pulse into an interrupt conductor 230 which, as it will be described below, then transmits it in a predetermined manner with a high speed (within) about one-tenth of a second) and then returns in a condition of minimal activity (non-operational condition). Another function of the timer 203 consists in supplying, upon inquiry via the control module 202, the actual time (real time clock) and a correct date, if necessary, in a special coded form in accordance with conventional declarations, e.g. with reference to a reference point 00:00 hours central european time, 01.01.1990. It is an advantage to select such form of the timer which would permit to set in the timer, during new installation, the actual date and an exact time. When an eventual deviation of the time (of the day) from the actual time is established, this is corrected in a course of post-synchronization. To this end, a data conductor 220 is used, which transmits data in both directions and is connected with a system working memory (RAM) 205, an interface 204, and a data memory 206. A piezoelectric resonator 211 is associated with the timer 203. Another signal, which actuates the control module 202 and is transmitted through the conductor 232, is a voltage monitoring signal which can be generated by a voltage monitoring circuit which cooperates with a charging circuit 208 and a power supply unit. When the externally supplied voltage and the internal voltage, which is produced by a voltage generator 209, are not anymore adequate, then in order to maintain the proper operation of the trip recorder, an alarm signal is generated. The alarm signal causes transfer of the data (which are, as a rule, volatile) from the working memory 205, which is formed as a random access memory, to the data memory 206 which is also formed as a random access memory the memory content of which is non-volatile, i.e., this memory retains its data for a long period without current supply. In order to be able to effect the data transfer, there is provided a power reserve which is stored in an accumulator 212 or a condensator with a capacity of several amper-seconds. After the transfer of relevant data, the control unit shifts into a stop condition and is again actuated when the voltage supply becomes stable and reaches an adequate magnitude.

In this way, the recording device is repeatedly protected against intentional and unintentional interruption in voltage supply. When voltage is available in the power supply conductor 3 or when the scanned drive gear rotates, the charging circuit 208 charges the accumulator 212.

Figure 3:
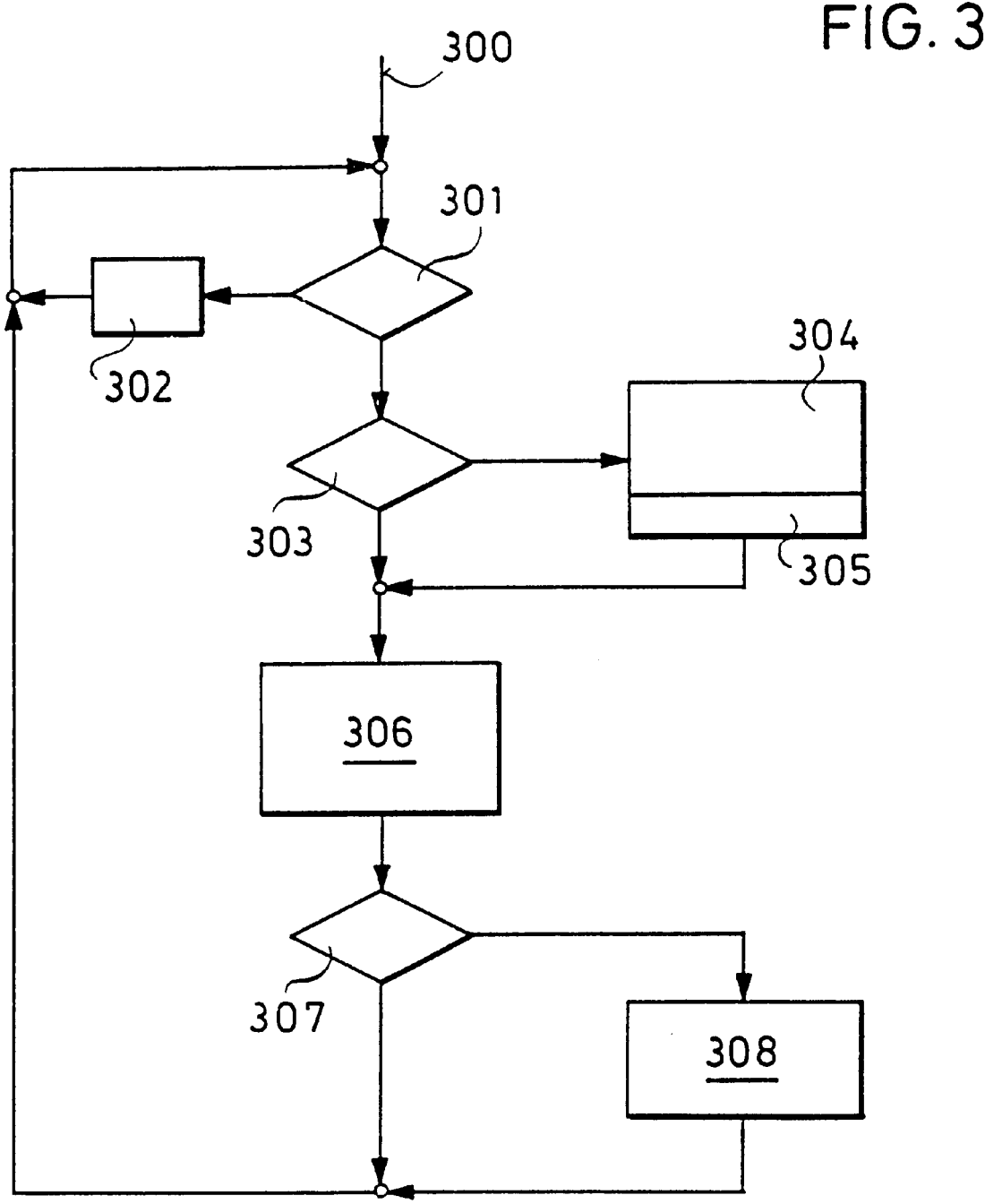
FIG. 3 shows a first flow chart of the most important data flows of a trip recorder according to the present invention.

The execution of the program stored in the trip recorder 2 and its control module 202 will now be explained with reference to a flow chart shown in FIG. 3. Proceeding from the starting step S 300, it is determined in a further step S 301, by means of the control module 202, whether the vehicle moves or not. If the vehicle does not move, i.e., when within a period of 15 sec no movement of the drive gear 1 is detected, in the step S 302, a single cue bit of the control module 202 is canceled, and the process starts anew with the start step 301. However, when the vehicle moves, the above-mentioned cue bit is scanned in a suitable sub-routine in step S 303. If it is in a set, active state, it is transferred to a next step, and a step 306 is executed. Otherwise, the cue bit is scanned in the following step S 304 of the timer 203 with the control module 202, and the so obtained time and day information in transmitted to a corresponding memory or bit region of the working memory 205. Thereupon the drive bit is set in a step 305, independent of its previous condition whereby the vehicle status, namely, the vehicle movement is recorded. Thereupon, the control module 202 execute the step S 306 which consists in that the actual speed of the vehicle is detected and is stored in the working memory 205. To this end, the time between approach of two teeth of the drive gear 1 to the sensor 201 is determined with a high precision. It represents an inversely proportional measure of the vehicle speed. After the execution of the step S 306, the processor executes the step S 307, with which it is determined whether the working memory 205 is completely filled with time and speed data or not. If the working memory 205 is not completely filled, the program branches back to the step S 300. If the working memory is completely filled, which takes place about 8.5 min when the vehicle moves, the data from the working memory 205 are transmitted to the non-volatile memory 206. The data transfer is effected in a step S 308. If necessary, the oldest in time information stored in the non-violative memory is overwritten, being thus canceled, because the memory 206 is formed as a ring memory. This takes place blockwise where each block usually contains 512 bytes of information units. After, the program step S 308 is finished, the program starts anew from the start step 300. Alternatively, the program may start from the start step S 301 when the interrupt conductor 231 indicates that the vehicle is moving.

Figure 4:
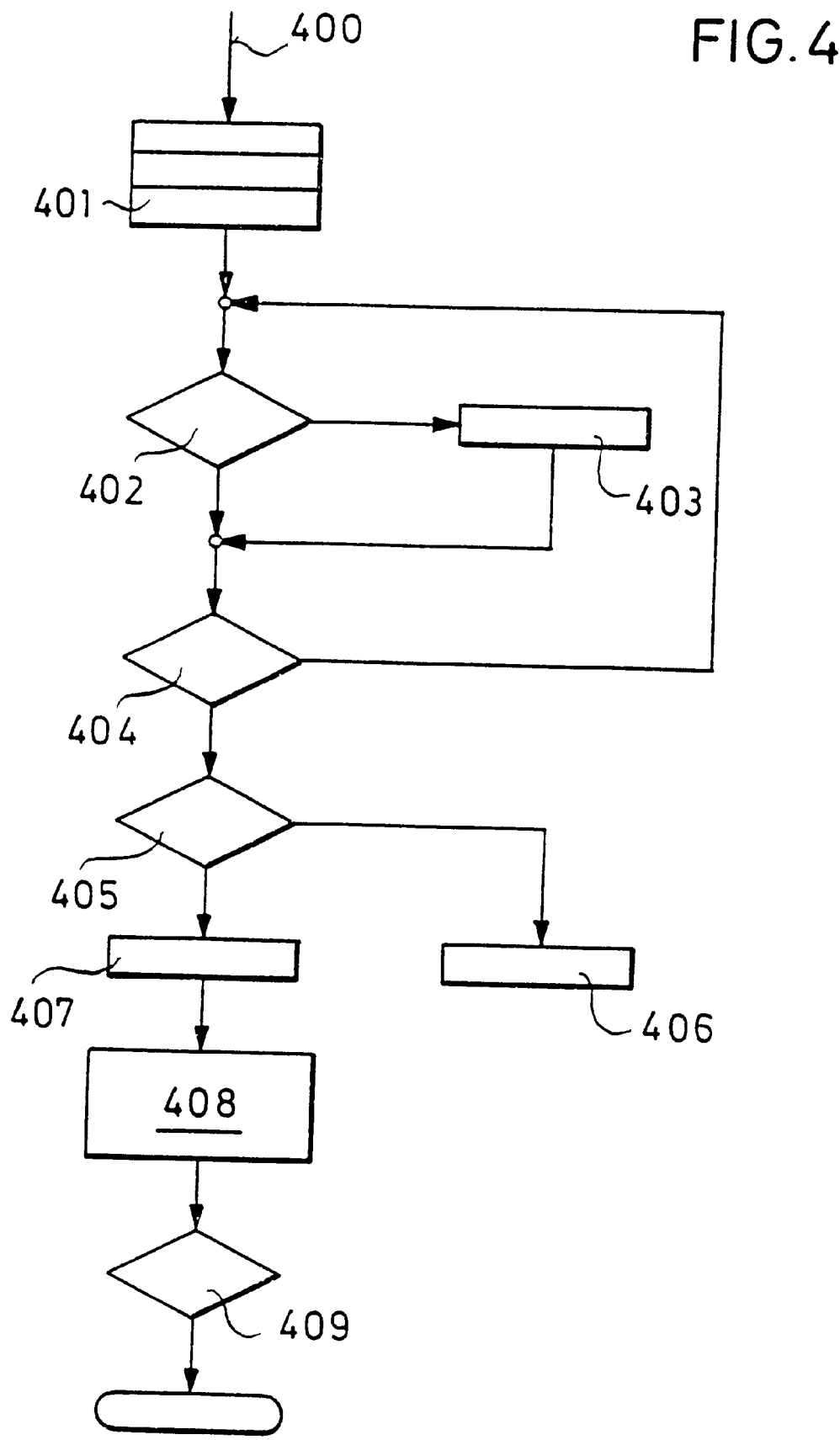
FIG. 4 shows another flow chart of a trip recorder according to the present invention.
Figure 5:
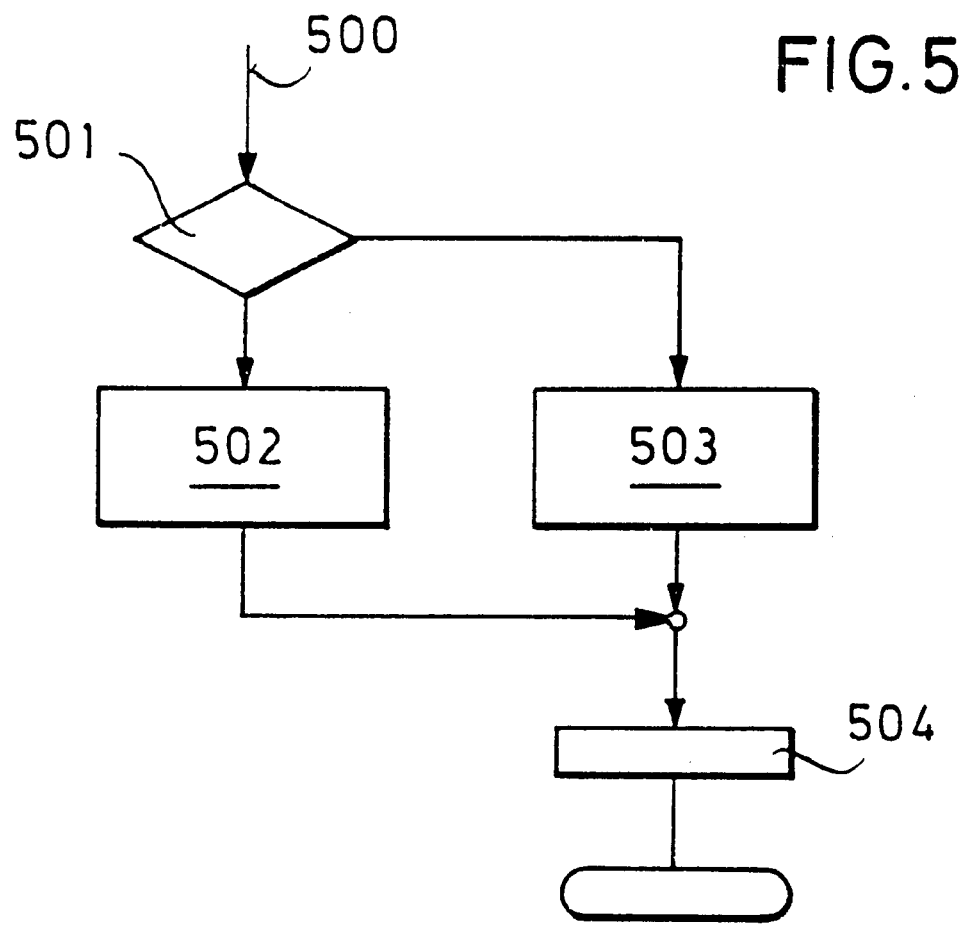
FIG. 5 shows a further flow chart of a trip recorder according to the present invention.

FIG. 4 illustrates a logical execution of a program for recording of an actual speed, which starts with a start step 400 and represents an alternative to the above-discussed speed determination. In this connection with a rhythm of about 1 sec. in a program step S 401, two electronic counters, an event counter and a timer which form part of the control module, are initially assigned each value "0". In the following step S 402 it is verified whether during a previously observed time period, an ascending front edge of a pulse of a signal generated by the sensor 201 was observed. If this is the case, then in the step S 403, the event counter is increased by a value 1, i.e., incrementally, whereupon the program proceeds with a step S 404. The step S 404 is effected immediately after the step S 402 when no ascending of the leading edge of the sensor-generated signal is observed. In step S 404, it is verified whether the time has established a time period of more than 1 sec. If this is not the case, the step S 402 is repeated again. Otherwise, the execution of the program continues with a step S 405. In this step, it is verified whether the event counter is still has the value "0". If this is the case, the vehicle is stationary, and the program branches to step S 406, in which the known drive bit from the step S 402 is canceled. Alternatively, it is concluded that the vehicle moves and the drive bit is set in step S 407 as a cue bit. After this step, the program proceeds with step S 408, in which the value, which is recorded in the event counter, is transformed into speed value, by using constants, which are specific for a motor vehicle, and the amount of the expired time. The so calculated numerical speed value is stored in the speed storing segment of the working memory 205, with the corresponding data being transmitted via the data conductor 220. In the following step S 409, an odometer, which forms part of the control module 202, has its value incrementally increased, i.e., by 1. After the execution of this program, the control module 202 is available for performing further normal functions or for other activities triggerable by an interrupt signal. The flow chart shown in FIG. 5 illustrates another time-dependent routine which is executed anew every five minutes and in which the odometer in step S 501 is tested as to whether the count of this counter already exceeded a certain value, e.g., 150. If this is the case, then in step S 502, a corresponding recording memo in a form of an allocated memory bit is entered under a heading "vehicle insert" into the memory 206 which, as it has already been discussed previously, if formed as a ring memory. Otherwise, the program branches to the step S 503, and in the memory 206 in the same place, a corresponding opposite entry is made. In both cases, the program proceeds to step S 504, in which the distance counter is set to zero, i.e., is reset. After effecting the step S 504, it, together with the step S 500, execute the initial interrupt routine which makes the control module 202 available for a further interrupt operation or for a turn-around data processing.

Figure 6:
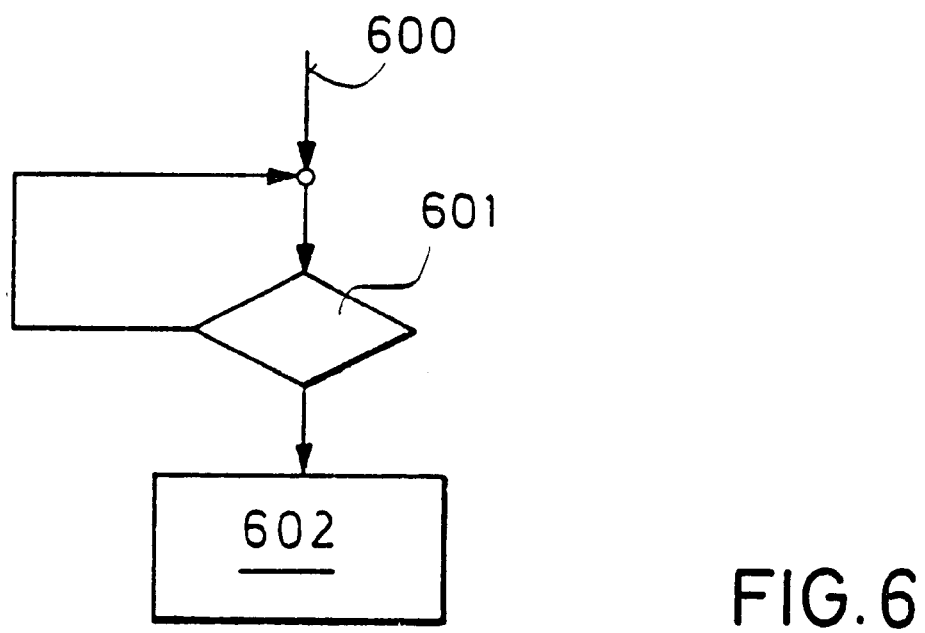
FIG. 6 shows a still further flow chart of a trip recorder according to present invention.

FIG. 6 illustrates the execution of the program when a reduction of voltage supply in the trip recorder occurs. The reduction of voltage below a predetermined limit, triggers (S 600), via the interrupt signal conduit 302, an interrupt routine which verifies, with a first program step S 602, whether the voltage supply is still below a predetermined minimal value and an interruption of the voltage supply should be assumed. If this is not the case, this test step should be repeated several times until the voltage supply again reaches an allowable value. Otherwise (with the reduced voltage supply), with step S 602, by using a substitute voltage supply from a battery, data from the (volatile) working memory (RAM) 205 are transmitted in the read-only memory 206. The control module 202 only then resumes its normal activity when the voltage supply exceeds the predetermined minimal value.

Figure 7:
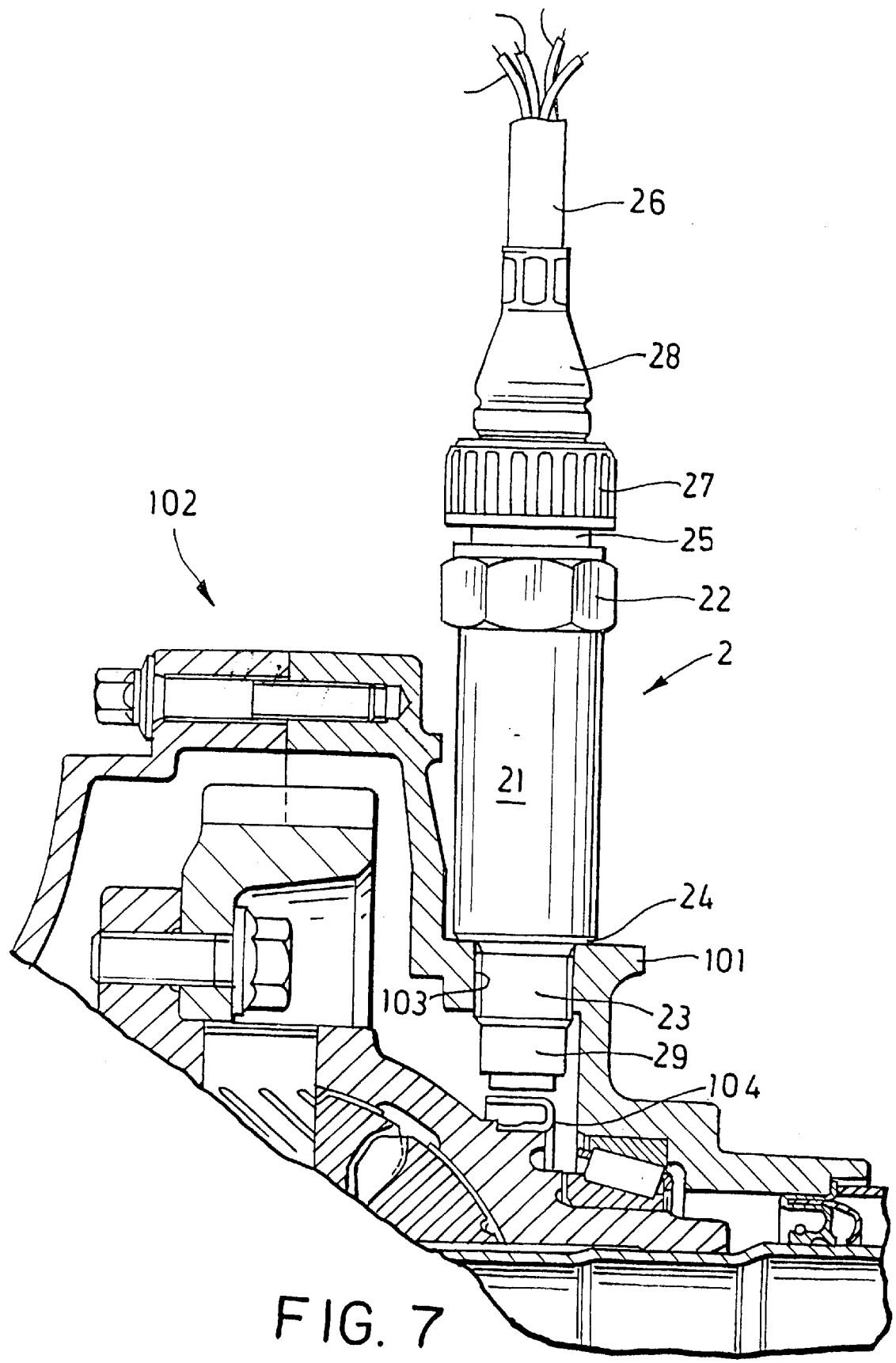
FIG. 7 shows a partially cross-sectional view illustrating mounting of the trip recorder on the drive gear housing shell of a motor vehicle.

FIG. 7 shows the trip recorder 2 according to the present invention which is mounted on the housing shell 102 of the motor vehicle drive gear. The trip recorder 2 includes in a trip recorder housing 21 having a threaded stub 23 at one of its opposite ends and a hexagonal nut 22 at its opposite end. The trip recorder housing 21 is secured to the housing shell 102 with the threaded stub 23 which is received in a threaded opening 103 formed in a shoulder 101 of the housing shell 102. The end surface of the trip recorder housing 21 is supported against the shoulder 101, with a washer 24 being provided between the shoulder 101 and the end surface of the trip recorder housing 21. A sensor head 29, which is provided at the free end of the threaded stub 23, serves for acquisition of travel pulses generated by an inputs element 109 symbolically representing the drive gear. The hexagonal nut 22 serves for connecting the trip recorder housing 21 with a screw cap 27 of a socket 28 of the cable 26. The trip recorder housing 21 has a connector base 25 cooperating with the socket 28 for connecting the conductors 3, 5, 6 with respective units of the trip recorder 2 located in the trip recorder housing 21.

For completeness sake, measures for reduction of a storage area for storing the drive data will now be discussed. Because for a stationary vehicle no data storage is necessary, at the end of a drive, only the time of the beginning of the stoppage is recorded. With the start of a new drive, the speed-time chronology is recorded in a standard manner. At that, for dates and time of the day, a 4-byte codification is used, which indicate a second-difference value with respect to the beginning of the year 1990. The subsequent speed values are stored in the allocated speed memory. The speed is stored not in absolute encoded values but in a differential form, which corresponds to recording of the acceleration. Because for conventional motor vehicles, the acceleration values are limited by a vehicle mass, it is sufficient to store, each second, the operational sign of the acceleration and the associated rate value (with a relatively rough grading) in an encoded form, so that a two-bit value per storage value will suffice. In this way, by using, e.g., a suitably encoded declaration, it is possible to reconstruct, with a memory block having a storage capacity of several hundred kilobyte, a driving course encompassing a time period of about 500 hours.

It should be emphasized one more time that with conventional tachographs, in which the tachograph system includes a drive side sensor, measuring, display and recording means arranged, as a rule, remotely from the sensor, and a number of necessary lead seals for mechanical protection of connecting lines and their connections, the measures, which are required for simultaneous inverted transmission of the sensor signals, and the precautions against the manipulation of the characterizing data are associated with significantly increased expenses. The increased expenses are associated with means, which has to be employed, to make the data manipulation much more difficult or to prove that the manipulation, if it took place, indeed occurred.

The present invention is based on a concept that this expenses can be substantially eliminated by recording the driving data as close to the source of the information as possible. This means that the entire system is significantly cheaper because EMC-problems do not play any role. The manipulation of sensor lines, of the recording device, and of the means that supplies information into the sensor lines, is excluded. Further, there exists a great flexibility in the arrangement of display and interrogation devices, which are associated with the trip recorder, and thus in the arrangement of the entire system. In other words, because of the elimination of the conventional trip recorder with its sealed instrumentation panel, more space is available for the display and interrogation devices. The trip recorder or the sensor-recorder unit according to the invention is easily mountable, i.e., connectable with the drive housing, so that its replacement can be effected with simple means. The apparatus itself is so designed that it is easily retrofitted and is compatible with the vehicle instrumentation. The comparatively small manufacturing and assembly costs permit, in case of failure, change of the drive gear or modification of the rear axle transmission of the vehicle, to completely replace the trip recorder.

I claim:

1. A driving data recording device for a motor vehicle for collecting at least one of time- and speed-dependent data, the recording device comprising a housing having means for fixedly securing the housing to a housing shell of a motor vehicle drive gear; a control module for processing collected data and located in the housing; and memory means located in the housing and cooperating with the control module.

2. A driving data recording device according to claim 1, wherein the memory means comprises a non-volatile memory for storing actual driving data, and wherein the recording device further comprises an energy accumulator for protecting the actual driving data stored in the non-volatile memory in case of an interruption of external voltage supply.

3. A driving data recording device according to claim 1, further comprising means for electrically connecting the housing of the recording device with a motor vehicle chassis.

4. A driving data recording device according to claim 1, further comprising a plurality of conductors for connecting the recording device with external devices, and wherein at least one of the plurality of conductors is formed as a light guide.

5. A driving data recording device according to claim 1, further comprising means for recording the driving data by a compressed, redundancy-reduced coding.

6. A driving data recording device according to claim 1, wherein the memory means comprises means for storing the driving data with a high chronological accuracy of dates and times of a day, and wherein the recording device further comprises means for connecting the storing means with an external data display capable of fetching out and reconstructing the stored driving data.

7. A driving data recording device according to claim 1 further comprising an internal timer, and a synchronization device for adjusting the internal timer to an exact date and time if the date and the time of the timer do not correspond to date and time signals of an external precise timer.

8. A driving data according device according to claim 1, further comprising an electrical generator for supplying at least partially power necessary for operation of the recording device.

9. A driving data recording device recording to claim 8, wherein the generator comprises at least one permanent magnet and a coil which generate, during movement of the motor vehicle, an alternative current, the generated alternative current representing a speed signal of a motor vehicle speed.

10. A driving data recording device according to claim 1, wherein the control means comprises means for executing partial programs consisting of comparatively short, interrupt, signal-triggered program portions with a comparatively high computation output.

* * * * *